Jan. 26, 1960  S. I. ROCHWITE  2,922,349
STEREOSCOPIC CAMERA
Filed Aug. 8, 1955  3 Sheets-Sheet 2
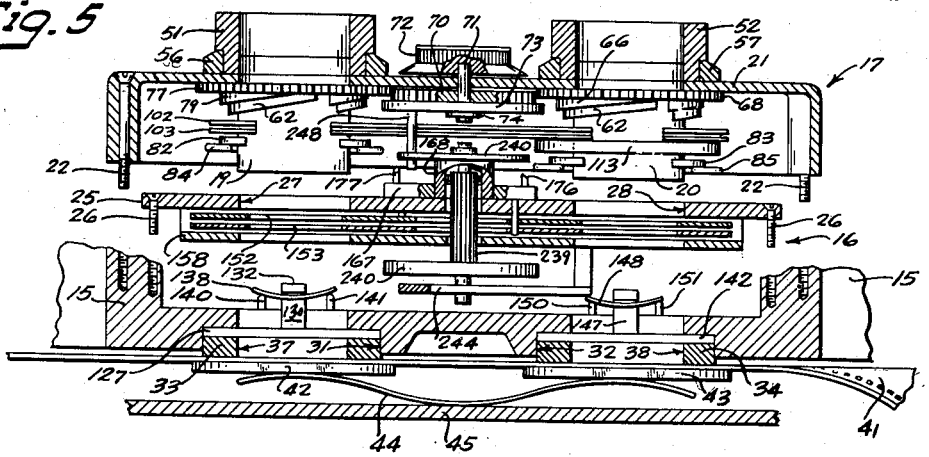
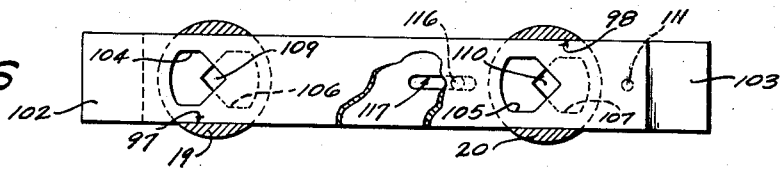
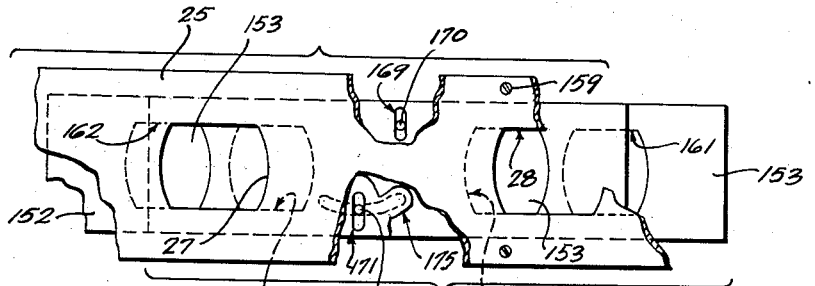
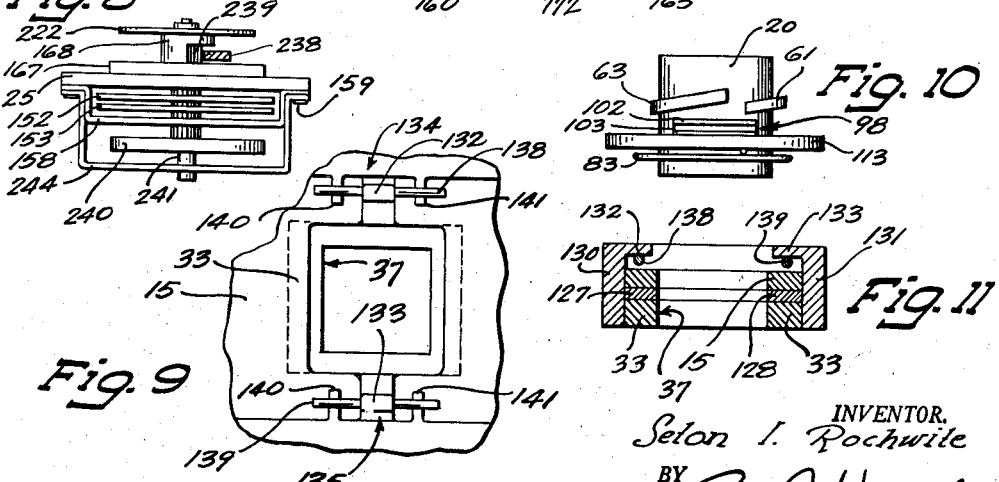
INVENTOR.
Seton I. Rochwite
BY
Attorney Jan. 26, 1960                S. I. ROCHWITE                2,922,349
                            STEREOSCOPIC CAMERA
Filed Aug. 8, 1955                                      3 Sheets-Sheet 3

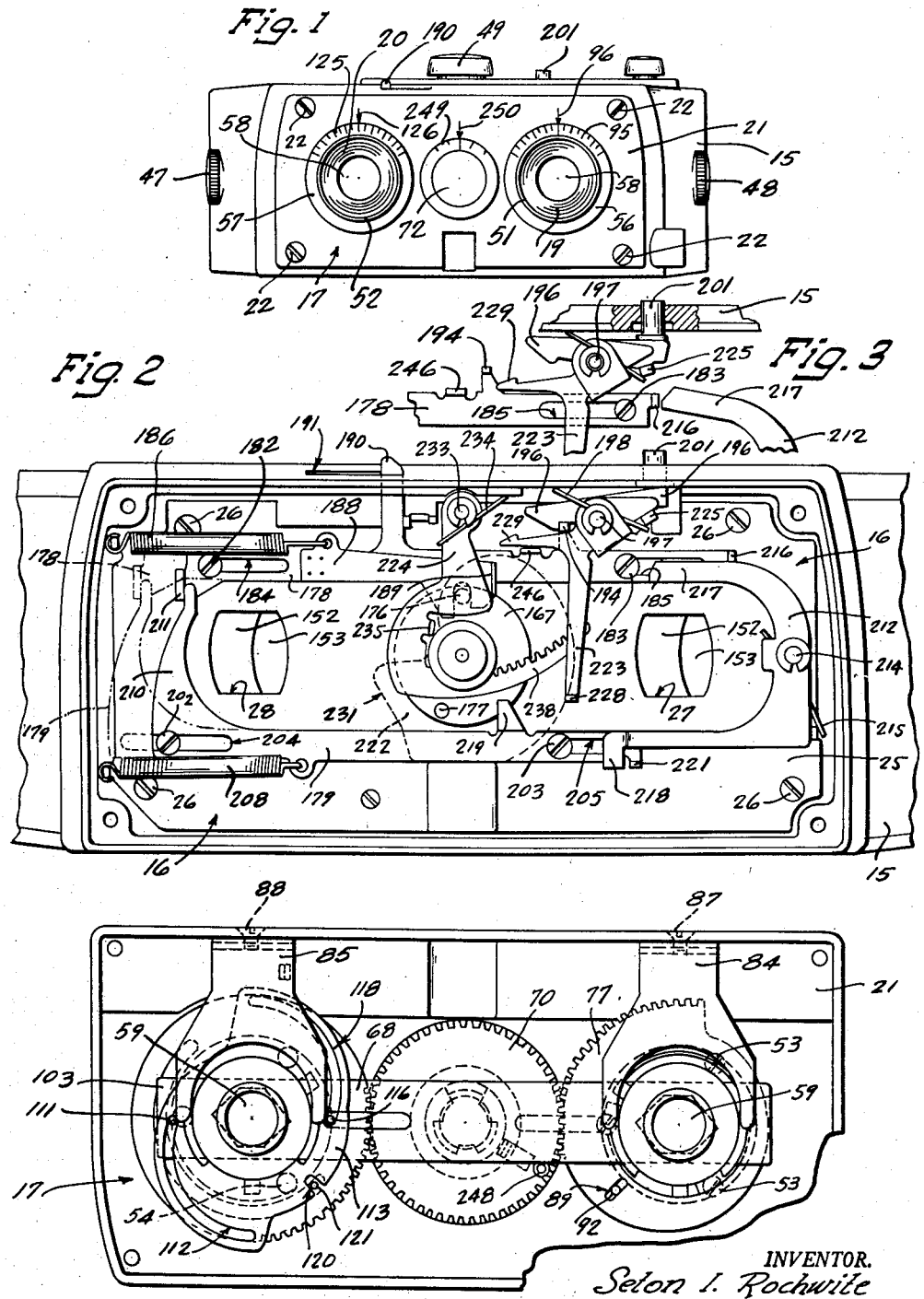

INVENTOR.
Seton I. Rochwite
BY
Elroy J. Wutschel
Attorney

United States Patent Office 2,922,349
Patented Jan. 26, 1960

2,922,349
STEREOSCOPIC CAMERA
Seton I. Rochwite, Boulder, Colo.
Application August 8, 1955, Serial No. 526,952
6 Claims. (Cl. 95—18)

This invention relates generally to stereoscopic cameras and more particularly to an improved actuating and control mechanism for a stereo camera.

A general object of this invention is to provide an improved stereoscopic camera.

Another object of this invention is to provide an improved simplified lens supporting and lens adjusting mechanism for a stereo camera.

Another object of this invention is to provide an improved diaphragm adjusting and shutter actuating mechanism for a stereo camera.

Another object is ot provide an improved unit type construction for a stereo camera.

Another object is to provide an improved adjustable diaphragm for selectively varying the lens apertures of a stereo camera.

Another object is to provide an improved, simplified shutter and actuating mechanism therefor.

Another object is to provide an improved speed regulating mechanism for selectively varying the speed of exposure.

A further object is to provide an improved lens supporting mechanism.

A further object is to provide an improved apparatus for predeterminately adjusting the focal distance of the spaced apart lenses of a stereo camera.

A further object is to provide an improved novel focussing arrangement for the spaced apart lenses of a stereo camera.

A further object is to provide an improved shutter mechanism for a stereo camera.

According to this invention, a stereo camera is provided with three principal cooperating assemblies or units that are removably secured together to constitute an improved stereo camera of a novel unit type construction. Each of the principal sub-assemblies or units is adapted to be separately assembled and is adapted to coact with each of the other units to constitute an improved stereo camera of greatly improved construction. The complete camera thus comprises a supporting assembly or frame, a shutter carrying assembly secured to the frame, and a lens and diaphragm assembly secured to the frame to constitute a protective housing for the actuating mechanism contained therein. In order to predeterminately adjust the image planes for spaced apart frames of a film strip, a pair of aperture plates are secured to the inner rear face of the frame to encircle a pair of spaced apart openings extending therethrough. A rear cover provided with a pair of resiliently biased pressure plates is secured to the frame in a manner to retain spaced apart portions of a film strip in engagement with rearward faces of the aperture plates. The shutter assembly comprises a pair of slidably superimposed shutter blades, a shutter blade actuating mechanism, and a speed regulating mechanism that are respectively carried by a base plate secured to the front face of the frame. The lens assembly in turn comprises a pair of spaced apart lens carrying tubes that are movably carried for axial focussing movement by a lens board secured to the frame in superimposed relationship above the shutter assembly. A pair of cam gears rotatably journalled about the lens tubes are operatively connected to effect axial focussing movement of the lens tubes, which are provided with slots adapted to receive a pair of slidably superimposed diaphragm elements.

The foregoing and other objects of the invention which will become more fully apparent from the following detailed specification, may be achieved by the particular stereo camera described herein by way of example as illustrating preferred embodying structure of the invention in connection with the following drawings, in which:

Figure 1 is a view in front elevation of a stereo camera incorporating the invention;

Fig. 2 is a view in front elevation of the shutter actuating and controlling mechanism;

Fig. 3 is an enlarged fragmentary view of the shutter release mechanism and showing one of the operating conditions thereof;

Fig. 4 is a plan view of the underside of the lens carrying assembly;

Fig. 5 is an enlarged detailed view in longitudinal section taken generally along the lines 5—5 in Fig. 1, and showing in diagrammatic form the three principal co-operating units comprising the camera;

Fig. 6 is an enlarged detailed, view, partly in plan and partly in horizontal section, of the diaphragm elements;

Fig. 7 is an enlarged plan view, with parts broken away, of the shutter assembly;

Fig. 8 is a view in elevation of the right end of the shutter carrying assembly;

Fig. 9 is an enlarged fragmentary plan view of a portion of the frame, showing an aperture plate secured thereto;

Fig. 10 is a view in side elevation of one of the lens tube assemblies;

Fig. 11 is an enlarged detailed fragmentary view, partly in side elevation and partly in transverse vertical section through one of the aperture plates; and, Fig. 12 is an enlarged diagrammatic view in perspective of the actuating and control mechanism.

Figure 12:
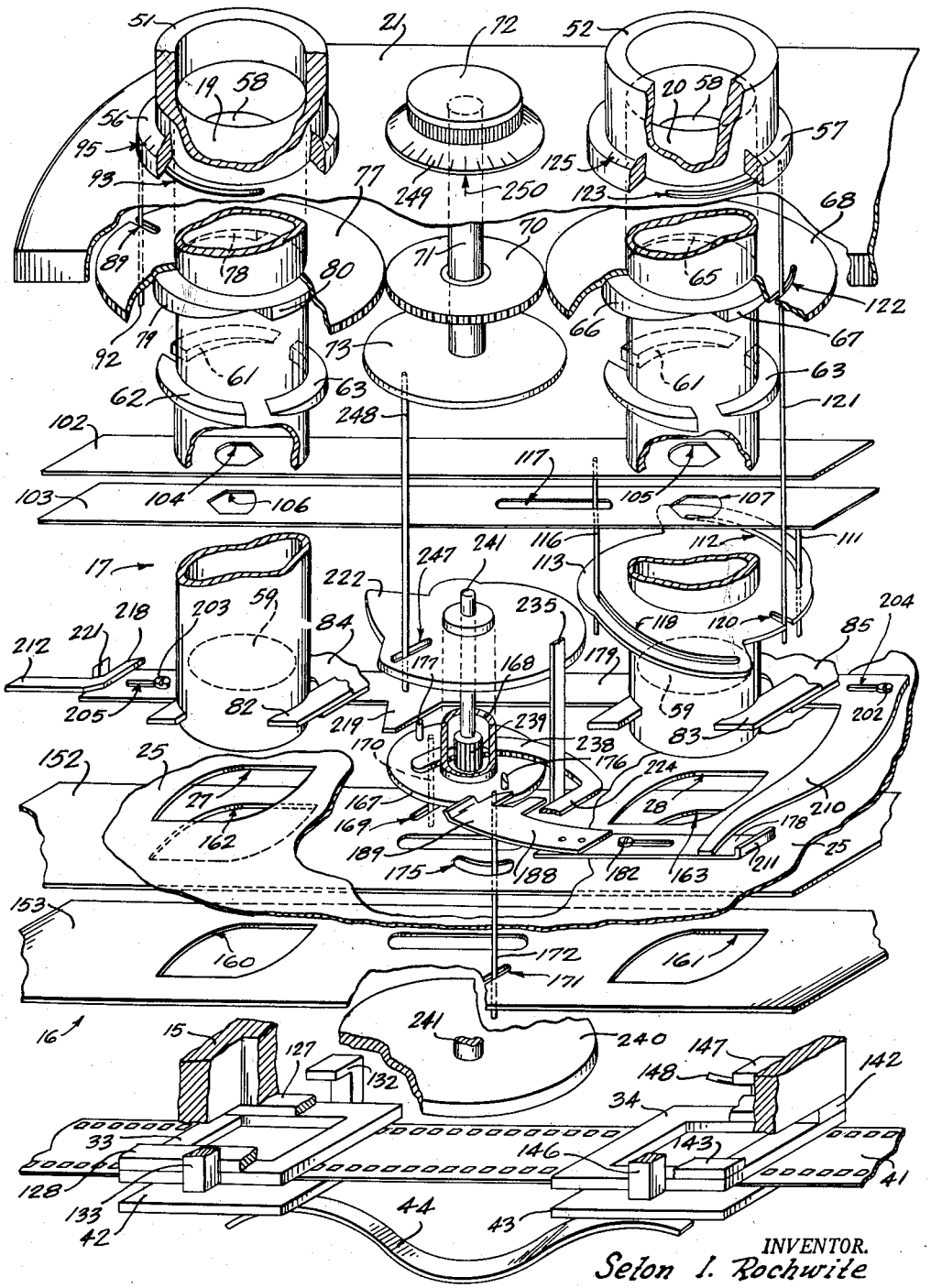

Referring more specifically to the drawings, and more particularly to Figs. 1, 2, 4 and 5 thereof, the stereo camera thereshown is of an improved unit type construction comprising essentially a main supporting frame or case 15, a shutter assembly 16, and a combined lens carrying and diaphragm assembly 17. A pair of lens tubes 19 and 20 are carried in spaced apart relationship by a hollow lens board 21 constituting the principal supporting member for the lens assembly 17, and that is secured to the frame 15 by means of screws 22 in a manner to cooperate therewith to form a protective housing for the camera actuating mechanism.

As shown in Fig. 5, the principal supporting member for the shutter assembly 16 is a shutter base plate 25 that is secured to the frame 15 by means of screws 26 within the protective housing constituted in part by the hollow lens board 21. The base plate 25 is provided with a pair of spaced apart openings 27 and 28 that are respectively aligned with the lens tubes 19 and 20. Beneath the shutter base plate 25, the frame or case 15 is likewise provided with a pair of enlarged spaced apart flanged openings 31 and 32. Within the frame openings, there are secured a pair of aperture plates 33 and 34 that are in turn provided with a pair of spaced apart openings 37 and 38 that are respectively aligned with the openings in the shutter base plate 25. The spaced apart frames of a selectively indexable sensitized film strip 41 are maintained in bridging engagement with the rearward faces of the aperture plates 33 and 34 by means of a pair of resiliently biased pressure plates 42 and 43. A biasing spring 44, disposed to actuate the pressure plates 42 and 43, is attached at its central portion to a rear cover 45 constituting a protective enclosure for the rearward portion of the frame 15. The rear cover 45 is removably secured to the frame 15 in well known manner by latching mechanism (not shown) that is actuated by control knobs 47 and 48 rotatably journalled at the opposite ends of the frame, Fig. 1.

For selectively advancing the film strip 44 relative to the spaced apart openings 37 and 38 in the aperture plates 33 and 34, Fig. 5, a rotatable film advance knob 49, Fig. 1, is rotatably journalled in the frame 15. The film advance knob 49 is connected to actuate a film advancing indexing mechanism (not shown) that is preferably similar to the improved film advancing mechanism disclosed in my U.S. Patent No. 2,906,183 entitled "Stereoscopic Camera."

To guide the lens tubes 19 and 20 in the lens assembly 17 for simultaneous axial focussing movement, as shown in Fig. 5, a pair of hollow tubular supports 51 and 52 are secured in spaced apart relationship to encircle corresponding circular openings in the lens board 21 by means of screws 53 and 54. The left tubular support 51 is provided toward its lower end with a flanged portion of reduced diameter, about which is rotatably journalled a setting ring 56 connected to effect simultaneous axial focussing movement of both of the lens tubes 19 and 20. In a similar manner, the right tubular support 52 is provided toward its lower end with a flanged portion of reduced diameter about which is journalled a setting ring 57 connected to adjust the aperture openings in each of the lens tubes 19 and 20. Each of the setting rings 56 and 57 is thus constrained for selective rotable movements between the flanged lower ends of the respective tubular supports 51 and 52, and the upper face of the lens board 21.

Each of the lens tubes 19 and 20 constitutes a unit or sub-assembly of substantially identical construction and is provided with lens systems having like numbers of lens elements. To facilitate the description, however only the upper lens element 58 and the extreme lower lens element 59 are shown in each of the lens tubes 19 and 20, Fig. 12. Since lens systems are well known in the art, it is not deemed necessary to describe the placement and characteristics of the lens elements (not shown) that are in well known manner mounted in each of the lens tubes 19 and 20 between the upper lens element 58 and the lower lens element 59. Suffice to state that the lens systems carried by the respective lens tubes 19 and 20 have identical focal lengths, since each of them are used simultaneously to take like pictures of the same subject, as is well known in the stereo camera art.

For effecting axial focussing movement, as best shown in Fig. 12, each of the lens tubes 19 and 20 is integrally formed with three circumferentially spaced, laterally extending, arcuately shaped cams 61, 62 and 63. The upper cam surfaces of the cams 61, 62 and 63 integrally formed with the lens tube 20, are disposed to coact with complementary cam surfaces presented by three arcuately shaped cams 65, 66 and 67 integrally formed on the lower hub of a focussing gear 68. The focussing gear 68 is journalled to rotate about the lens tube 20 and is meshingly engaged by an intermediate idler gear 70 that is rotatably carried by a speed controlling shaft 71 journalled to rotate in the lens board 21. The shaft 71 has affixed to its upper end a shutter speed regulating knob 72 and to its lower end a speed regulating plate 73 that is retained in engagement with the shaft by means of a snap washer 74. The idler gear 70 is thus constrained for rotation between the lens board 21 and the speed control plate 73 for rotation independently of the shaft 71.

The idler gear 70 is connected to be actuated by a focussing gear 77 journalled for rotation about the lens tube 19. The underside of the hub of the focussing gear 77 is likewise provided with three circumferentially spaced cams 78, 79 and 80 presenting lower cam surfaces complementary to, and disposed to engage the upper surfaces of the cams 61, 62, and 63 secured to the lens tube 19. As indicated in Fig. 5, the cams 61, 62 and 63 integrally formed with the lens tubes 19 and 20 are continuously maintained in abutting engagement with the complementary cams respectively formed on the hubs of the focussing gear 77 and the focussing gear 68.

The lens tubes 19 and 20 are resiliently biased in an upward direction in a manner that the cams integrally formed therewith are continuously urged forwardly into abutting engagement with the complementary cams formed on the gears 77 and 68. To accomplish this, as shown in Figs. 4, 5 and 12, a pair of U-shaped fitting washers 82 and 83 respectively secured to the lower ends of the lens tubes 19 and 20 are engaged by U-shaped springs 84 and 85 respectively secured to the lens board 21. To facilitate assembly, the U-shaped washers 82 and 83 are slidably moved into resilient engagement with a pair of slots formed in the opposite sides of the lens tubes 19 and 20. The springs 84 and 85, which are disposed to engage the underside of the U-shaped washers 82 and 83 are provided with flanged opposite ends that are secured to an inner side edge of the lens board 21 by means of screws 87 and 88.

Inasmuch as the lens tubes are restrained against rotation, it will be apparent that simultaneous rotation of the focussing gears 77 and 68 will rotate the cams integrally formed therewith to effect simultaneous axial movement of the lens tubes. To accomplish this, as shown in Fig. 12, the focussing gear 77 is provided with a radial slot 89 that is engaged by the lower end of a pin 92 extending upwardly through an arcuate slot 93 in the lens board 21 and is secured at its opposite end to the underside of the setting ring 56. Thus, rotation of the setting ring 56 in a counter clockwise direction effects a corresponding rotation of the focussing gears 77 and 68. Counter clockwise rotation of the gears 77 and 68 rotates the cams formed therewith relative to the associated cams 61, 62 and 63 attached to the lens tubes 19 and 20 which are then moved axially inwardly in exact synchronism. In a similar manner, the setting ring 56 is rotatable in a clockwise direction to rotate the gears 77 and 68 in a corresponding direction for moving the lens tubes 19 and 20 outwardly relative to the lens board 21. Thus the setting ring 56 is selectively rotatable to effect the required simultaneous axial adjustment of the lens tubes 19 and 20, for obtaining selective focussing adjustment of the lens systems respectively carried thereby.

To effect the required focussing adjustment, appropriate indicia 95 scribed on the periphery of the setting ring 56 is movable into registration with a zero mark 96 scribed in adjacent relationship on the upper face of the lens board 21. The indicia 95 are calibrated in units of linear measure, extending to infinity, for focussing the lens tubes 19 and 20 in accordance with the distance a particular subject, i. e. the subject plane is from the camera.

To restrain the lens tubes 19 and 20 against rotation, and to adjust the aperture openings available through the lenses, each of the lens tubes 19 and 20 is provided with transverse slots 97 and 98 respectively for receiving a pair of axially slidable diaphragm elements 102 and 103, as shown in Figs. 5, 6 and 10. Each of the slots 97 and 98 formed in the lens tubes 19 and 20 is positioned above the innermost lens elements 59 respectively carried thereby. As shown in Fig. 6, the transverse slots 97 and 98 are delimited by diametrically opposed flat sides respectively disposed to be slidably engaged by the opposite parallel, flat edges of the slidable diaphragm elements 102 and 103. Thus, the slidable engagement of the opposite flat parallel edges of the diaphragm elements 102 and 103 with the opposite sides of the slots 97 and 98 guide the diaphragm elements for longitudinal slidable movement. Likewise, the diaphragm elements 102 and 103 restrain the lens tubes 19 and 20 against rotation, rendering the stationary cams 61, 62, and 63 respectively formed therewith operable to effect focussing movement of the tubes upon rotation of the gears 77 and 68.

To selectively adjust the aperture openings respectively available through the lens tubes 19 and 20, each of the slidably superimposed diaphragm elements 102 and 103 is provided with a pair of spaced apart openings, that are selectively positionable in adjustably overlapping relationship. As shown in Figs. 6 and 12, the upper diaphragm element 102 is provided with identical, irregularly configured openings 104 and 105 having angularly converging ends both oriented in a rightward direction. In a similar manner, the lower diaphragm element 103 is provided with corresponding, identical, irregularly configured openings 106 and 107 having angularly, converging ends, oriented in a leftward direction. With the slidably superimposed diaphragm elements operatively positioned in the slots 97 and 98 in the lens tubes 19 and 20, the openings 104 and 105 in the upper element 102 are in overlapping relationship with the openings 106 and 107 respectively provided in the lower element 103. As a result, with the diaphragm elements adjustably positioned as shown in Fig. 6, the oppositely oriented overlapping openings respectively provided in the lower element 102 and the upper element 103 provide a pair of substantially square apertures 109 and 110. Irrespective of the adjustment of the elements 102 and 103 from the positions shown in Fig. 5, the resulting apertures, such as the square openings 109 and 110, formed by the overlapping openings in the elements are always in exact optical alignment with the lens tubes 19 and 20 respectively. To vary the size of the apertures available through the overlapping spaced apart openings, the diaphragm elements 102 and 103 are operatively connected to be simultaneously, longitudinally moveable in opposite directions by exact equal amounts.

To this end, as shown in Fig. 12, a downwardly extending pin 111 secured to the underside of the lower diaphragm element 103 is engaged by an arcuately shaped cam slot 112 formed in a cam 113 journalled for rotation about the lower portion of the lens tube 20. In a similar manner, a pin 116 secured to the underside of the upper diaphragm element 102 extends downwardly through a longitudinal slot 117 formed in the lower diaphragm element 103. The lower end of the pin 116 is engaged by an arcuate cam slot 118 formed in the rotatable cam 113. The arcuate cam slots 112 and 118 are formed in diametrically opposed relationship toward the opposite sides of the cam 113 and are of identical configuration. Each of the cam slots extends from diametrically opposed points, equidistant from the rotational axis of the cam 113 and extends outwardly in arcuately diverging directions.

With the cam 113 positioned, as indicated in Fig. 12, the actuating pins 111 and 116 are disposed to be so engaged by the inner ends of the cam slots 112 and 118 as to be in their closest allowable positions relative to the axis of the cam 113. During this condition of cam adjustment, the respectively overlapping openings presented by the diaphragm elements 102 and 103 provide spaced apart lens apertures of maximum allowable size. As the cam 113 is rotated in a clockwise direction to reduce the size of the spaced apart aperture openings, the cam slots 112 and 118 operate to effect a gradual simultaneous axially outward movement of the actuating pins 111 and 116. Inasmuch as the diaphragm elements 102 and 103 are constrained by the respective slots in the lens tubes 19 and 20 for straight-line longitudinal movement, the pins 111 and 116 respectively secured thereto are longitudinally movable. Thus, as the cam 113 is rotated in a clockwise direction, the actuating pin 111 is moved outwardly to effect a corresponding rightward longitudinal movement of the lower diaphragm element 103. At the same time, the actuating pin 116 is moved outwardly to effect a corresponding leftward longitudinal movement of the upper slidably superimposed diaphragm element 102. Since the actuating pins 111 and 116 are moved outwardly simultaneously by exactly equal distances, depending on the movements of the cam 113, the diaphragm elements 102 and 103 are both moved by correspondingly equal distances. As a consequence, the overlapping spaced apart, overlapping openings in the diaphragm elements, are operative to produce apertures that are in precise optical alignment with the respective lens tubes 19 and 20.

As the cam 113 is rotated further in a clockwise direction, the angularly converging opposite ends of the openings in the respective diaphragm elements 102 and 103 overlap to produce two substantially square apertures, such as the apertures 109 and 110 in Fig. 6. The range of rotatable adjustment of the cam 113 is limited by the length of the respective cam slots 112 and 118 formed therein to, in turn, limit the largest and smallest spaced apart apertures available through the superimposed diaphragm elements. With the cam 113 rotated to its limit of movement in a clockwise direction, the respective overlapping openings in the diaphragm elements are operative to produce square apertures of the smallest size. With the cam 113 rotated to its limit of movement in a counter-clockwise direction, the irregularly configured opposite ends of the openings in the diaphragm elements overlap to produce a pair of enlarged spaced apart openings, thus permitting maximum passage of light through the respective lens tubes 19 and 20.

To effect selective adjustment of the diaphragm elements, the cam 113 is provided with a radial slot 120 that is engaged by the lower end of a bodily movable actuating pin 121. The pin 121 extends upwardly through an arcuately formed slot 122 in the gear 68, through another arcuate slot 123 in the lens board 21, and is secured at its upper end to the underside of the diaphragm setting ring 57. Selective rotation of the setting ring 57 actuates the pin 121 to effect a corresponding rotation of the cam 113 that is journalled about the lower portion of the lens tube 20. Rotation of the cam 113 in turn effects the required longitudinal adjustment of the diaphragm elements 102 and 103 to produce spaced apart apertures of a size determined by the adjustment of the setting ring 57. The sizes of the spaced apart apertures is indicated by indicia 125 on the setting ring 57 that are adapted to be read against a zero mark 126 on the lens board 21.

As is well known in the art, the spaced apart lenses of a stereo camera must be spaced exactly equal distances from the image plane, i.e., the plane through which a film strip, such as the film strip 41, is positioned within the camera. Inasmuch as the spaced apart stereo lenses operate to take two pictures of the same subject, the lenses must be spaced equal distances from the image plane irrespective of the axial focussing adjustment of the lenses relative to the subject plane. Heretofore, this relationship has been obtained by effecting a selective relative adjustment of the spaced apart lenses relative to the lens board and to a single image plane in which both spaced apart frames of the film strip were positioned. Consequently, it has in the past been necessary to provide an extremely complicated mounting arrangement for the spaced apart lenses of a stereo camera. Likewise, the mounting procedure for effecting the required equalized adjustment of the lens tubes in the lens board has been of necessity extremely complicated and time consuming.

Another principal advantage of the present invention is the provision of cooperating structure within the frame adapted to facilitate and simplify the equalized relative adjustment between the spaced apart lens tubes and the image plane. To this end, the frame 15 is provided with the spaced apart enlarged rectangular openings 31 and 32 respectively disposed to receive the aperture plates 33 and 34 that are adjustably positionable relative to the respective lens tubes 19 and 20 (see Fig. 5). The rearward faces of the aperture plates 33 and 34, therefore, are disposed to provide separate, adjustably positionable image planes for receiving the spaced apart frames of the film strip 41. This arrangement obviates the necessity of a complicated mounting structure for the lens tubes 19 and 20 within the lens board 21.

After the associated cooperating parts comprising the complete lens carrying assembly 17, Fig. 4, have been operatively assembled, it is unnecessary to effect any further individual adjustment of the lens tubes 19 and 20 relative to the lens board 21. In other words, the coaction between the cooperating parts including the focussing gears 77 and 68, as well as the diaphragm elements 102 and 103, is such as to properly position the lens tubes 19 and 20 relative to each other. The lens carrying assembly 17 is then secured to the frame by means of the screws 22, and the diaphragm setting ring 57 adjusted to provide the widest possible lens aperture openings. The focussing setting ring 56 is likewise rotated to simultaneously move the lens tubes axially outward as far as possible, to the position for focussing on the closest available subject plane.

Assume, now that the lens carrying assembly 17 and the shutter assembly 16 are operatively assembled to the frame 15 by means of the screws, shown in Fig. 5. By means of instruments (not shown), a measurement is then taken to determine the distances from the focal point for each of the lens tubes to an imaginary image plane rearwardly of each of the frame openings 31 and 32. Due to slight dimensional variations in the co-acting parts of the lens carrying assembly 17, as well as in the frame 15, it will be apparent that the exact positions of the respective imaginary image planes for the lens tubes 19 and 20 may be different distances rearwardly of the rear face of the frame 15. In accordance with the dimensions obtained, the aperture plates 33 and 34 are operatively assembled into the respective openings in the frame in a manner that the rearward faces of the aperture plates coincide with the predeterminately located image planes for the left and right lens tubes 19 and 20.

To accomplish this, a pair of shims 127 and 128, as shown in Figs. 5, 11 and 12, of the required thickness are positioned toward the opposite sides of the flanged frame opening 31. The aperture plate 33 is then positioned in the frame opening 31 with its lower opposite edges abutting the shims 127 and 128, thus positioning the rear face of the aperture plate 33 the required distance from the rear face of the frame 15 to provide a properly positioned image plane for the lenses carried by the lens tube 19. To retain the aperture plate 33 within the frame opening a pair of laterally extending arm members 130 and 131 integrally formed with the aperture plate 33 are provided with flanged upper ends 132 and 133. To position the rectangular opening 37 in the aperture plate 33 properly relative to the optical axis of the lens tube 19 and the film strip 41, the arm members 130 and 131 secured to the plate are received within diametrically opposed slots 134 and 135 in the frame 15 (that extend outwardly from the central rectangular opening). The upper flanged ends 132 and 133 of the arms are respectively engaged by springs 138 and 139, the opposite ends of each spring being respectively engaged by a pair of spaced apart lugs 140 and 141 integrally formed with the frame 15.

In a similar manner, the aperture plate 34 is positioned in the frame opening 38 with the opposite edges thereof abutting a pair of shims 142 and 143 of required predetermined thickness. The shims 142 and 143 are positioned toward the opposite inner flanged edges of the frame opening 38 to position the rear face of the right aperture plate 34 in the image plane for the lens in the right lens tube 20. A pair of lateral arms 146 and 147 secured to the opposite edges of the right aperture plate 34 engage slots in the frame 15 to properly position the rectangular opening 38 formed in the plate relative to the optical axis of the right lens tube 20. The upper ends of the arms 146 and 147 are provided with flanges, that are respectively engaged by springs 148, the opposite ends of which are engaged by lugs 150 and 151 secured to the frame 15. The arrangement for securing both of the aperture plates 33 and 34 within the frame 15 is identical.

Within the housing formed by the hollow lens board 21 and the upper portion of the frame 15, there is positioned the shutter assembly 16, as shown in Figs. 2, 5 and 12. The supporting base plate 25, secured to the frame 15 by means of the screws 26, is adapted to movably support a pair of slidably superimposed shutter blades 152 and 153, a shutter actuating mechanism, and a shutter timing mechanism to constitute the complete unitary shutter assembly 16. As shown in Figs. 5 and 7, the shutter blades 152 and 153 are slidably carried in superimposed relationship within a blade guide plate 158 secured at its opposite edges to the underside of the shutter base plate 25 by means of screws 159. The shutter blades 152 and 153 are thereby maintained in closely superimposed slidable engagement between the underside of the shutter base plate 25 and the guide plate 158 for relative longitudinal movement in opposite directions.

As shown in Fig. 7, the shutter blades 152 and 153 are in closed position to preclude passage of light through the respective lens tubes 19 and 20 to the spaced apart frames of the film strip. With this condition existing, each of the shutter blades 152 and 153 is moved out of registration with the other by being moved in opposite directions a distance slightly greater than one-half (½) the width of the base plate openings 27 and 28. With the lower shutter blade 153 moved rightwardly (relative to the base plate), a pair of shutter openings 160 and 161 formed therein are moved rightwardly a corresponding distance. At the same time, the upper shutter blade 152 is displaced an equal distance in a leftward direction in a manner that a pair of spaced apart openings 162 and 163 formed therein are likewise moved in a leftward direction. As shown in Fig. 7, with both shutter blades displaced equal distances in opposite directions, the shutter openings 160 and 161 in the lower blade 153 are moved out of registration with the openings 162 and 163 in the upper blade 152.

To permit passage of light through lens tubes 19 and 20 to the film strip 41, the shutter blades 152 and 153 are moved in opposite directions from the normally closed position, Fig. 7, to an open position, as shown in Figs. 5 and 12. To accomplish this, the lower shutter blade 153 is moved leftwardly at the same time the upper blade 152 is moved rightwardly in a manner that the respective openings in the blades are simultaneously moved into registration with each other, as well as the respective openings 27 and 28 in the shutter base plate 25 and corresponding aligned openings in the shutter guide plate 158. After being moved to open position, Figs. 5 and 12, the shutter blades are again moved in opposite directions to the normally closed position shown in Fig. 7.

For effecting simultaneous actuating movement of the slidably superimposed shutter blades 152 and 153, as shown in Figs. 2, 5 and 12, there is provided a shutter actuating disc 167 that is journalled to rotate about a hollow, tubular support 168 secured to the shutter base plate 25. To move the upper shutter blade 152, a transverse slot 169 formed therein is engaged by an actuating pin 170 extending upwardly through an arcuate slot (not shown) in the base plate and secured at its upper end to the underside of the actuating disc 167. In a similar manner, a transverse slot 171 in the lower shutter blade 153 is engaged by an actuating pin 172. The pin 172 extends upwardly through an enlarged slot 175 in the upper blade 152, a corresponding enlarged slot (not shown) in the base plate 25 and is secured at its opposite end to the underside of the actuating disc 167 in diametrically opposed relationship to the actuating pin 169.

To rotate the actuating disc 167 in a counterclockwise direction for moving the shutter blades 152 and 153 to an open position, an upstanding beveled opening pin 176 is secured to the upper face of the disc 167 as shown in Figs. 2 and 12. For rotating the actuating disc 167 in a clockwise direction to effect return movement of the shutter blades 152 and 153 to normally closed position, an upwardly extending closing pin 177 is secured to the upper face of the disc 167. To engage the respective beveled actuating pin 176 and the closing pin 177, there are provided a combined cocking and opening bar 178 and a closing bar 179 mounted for longitudinal sliding movement on the upper face of the shutter base plate 25, as shown in Figs. 2 and 12.

A pair of screws 182 and 183 secured to the base plate 25 and extending through a pair of spaced apart parallel slots 184 and 185 in the opening bar 178 operate to guide the bar for sliding movement, as well as to limit the extent of such sliding movement in either direction. The opening bar 178 is normally urged to move in a leftward direction by means of an actuating spring 186 secured at one end to an upstanding lug integrally formed with the shutter base plate 25. At its opposite end, the spring 186 is secured to an opening pin engaging arm 188, the leftward end of which is, in turn, secured to the slidable opening bar 178 for longitudinal movement therewith. With the opening bar 178 moved to its extreme rightward or cocked position, Fig. 2, the opposite forked end 189 of the arm member 188 is in operatively engaged position with the beveled opening pin 176 secured to the shutter actuating disc 167. For effecting rightward cocking movement of the opening bar 178, an upwardly extending cocking lever 190 integrally formed therewith extends upwardly through a longitudinal slot 191 formed in the upper edge of the frame 15.

Manual rightward cocking movement of the lever 190, thus effects corresponding rightward movement of the shutter opening bar 178 from its extreme leftward position, represented fragmentarily in Fig. 2 of the drawings by the dotted line showing 178.

As the opening bar 178 is moved from its leftward toward its rightward position, the rightward vertically movable forked end 189 of the arm member 188 secured thereto is engaged by the beveled upper end of the opening pin 176. The arm member 188, secured at its leftward end to bar 178, is constructed of spring steel and is so arranged that the rightward, forked end 189 thereof is vertically movable relative to the upper face of the shutter actuating disc 167. Normally, the resilient action of the arm member 188 operates to urge the forked end thereof downwardly to a position adjacent the upper faces of the opening bar 178 and actuating disc 167. Thus, the beveled upper end of the pin 167 urges the rightward end of the arm member 188 vertically upward in a manner that the forked portion thereof moves into a position of operative engagement with the pin 176, as shown in Fig. 2.

At the same time, as the arm 188 is engaged by the beveled upper end of the opening pin 176, during rightward movement, an upwardly extending lug 194, integrally formed with the bar 178, engages an angular cam surface presented by a pivotal tripping lever 196. This engagement effects upward movement of the leftward end of the tripping lever 196 which is journalled for pivotal movement about a shaft 197 secured at its lower end to the shutter base plate 25. The tripping lever 196 is biased by a spring 198 to rotate in a counterclockwise direction about the shaft 197, with the rightward end of this lever, being movable into abutting engagement with an inner edge of the frame to limit leftward pivotal movement. As the opening bar 178 continues to move in a rightwardly direction, the spring 198 operates to urge the upwardly moved leftward end of the lever 196 in a manner that a latch formed therewith engages the lug 194 secured to the opening bar 178. Thus, the latch formed with the tripping lever 196, operates to engage the lug 194 to retain the opening bar 178 in a rightward or cocked position, as shown in Fig. 2, and with the forked rightward end 189 of the arm 188 in engagement with the opening pin 176.

To initiate leftward movement of the opening bar 178 in response to the spring 186, a shutter tripping button 201 is slidably mounted in the upper wall of the case 15. At its lower end the button 201 engages the rightward end of the pivotal tripping lever 196. Depressing the trip button 201 pivots the lever 196 in a clockwise direction to move the latch integrally formed therewith out of engagement with the lug 194, thus causing the opening bar 178 to move leftwardly. Leftward movement of the opening bar 178 and the arm member 188, in turn, effects counterclockwise rotation of the shutter actuating disc 167 to move the shutter blades 152 and 153 from closed position, Fig. 7, to open position, Fig. 5. Leftward movement of the opening bar 178, subsequently, after a predetermined interval, operates to effect a corresponding leftward movement of the shutter closing bar 179 for returning the shutter blades to closed position.

As shown in Fig. 2, the shutter closing bar 179 is guided for longitudinal sliding movement by a pair of screws 202 and 203 extending through a pair of slots 204 and 205 formed in the bar 179 and into engagement with the shutter base plate 25. The slots 204 and 205 limit the extent of longitudinal movement of the bar 179 which is connected to be normally urged in a leftward direction by means of a spring 208. At one end, the spring 208 is connected to the closing bar 179 and at its opposite end to a lug formed with the shutter base plate 25. By means of the arrangement, the spring 208 urges the closing bar 179 to move from its rightward or cocked position to an extreme leftward position, indicated in fragmentary form by the dotted lines 179 in Fig. 2. To effect closure of the shutter blades 152 and 153, after the opening bar 178 has moved in a leftward direction, the closing bar 179 is arranged to move independently, of, and in predetermined lagging relationship to the leftwardly moving opening bar 178. Rightward movement of the closing bar 179, on the other hand, is effected simultaneously with rightward movement of the opening bar 178 to the cocked position, shown in Fig. 2.

To accomplish this, a lateral arm 210 integrally formed with the shutter closing bar 179 is engaged by an upwardly extending lug 211 integrally formed with the shutter opening bar 178. Thus rightward manual movement of the cocking lever 190 effects a simultaneous rightward movement of the opening bar 178 and the closing bar 179. With the opening bar 178 restrained in rightward cocked position by the tripping lever 196, as hereinbefore described, the closing bar 179 is likewise retained in rightward cocked position by means of the arm 210 engaging the opening bar lug 211. To restrain the closing bar 179 against immediate leftward movement, in response to leftward movement of the opening bar 178, there is provided a pivotably mounted U-shaped release lever 212. The release lever 212 is mounted for slight pivotal movement about an extending shaft 214 secured to the shutter base board 25, and is normally urged to pivot downwardly in a clockwise direction by means of a spring 215 engaged at one end by an inner side edge of the case 15.

As shown in Fig. 2, however, an upstanding lug 216 secured to the rightward end of the opening bar 178 engages an upper arm 217 of the release lever 212 to maintain the entire lever in its downwardly pivoted position. With the release lever 212 retained in its downward position, a latch 218 formed in the lower arm of the lever is positioned to engage an upstanding lug 221 at the rightward end of the closing bar 179. The release lever 212 is restrained against upward movement, until the opening bar 178 moves leftwardly a sufficient distance for the lug 216 secured to the bar 178 to clear the extreme leftward end of the upper release lever arm 217. At this movement, as shown in Fig. 3, the release lever 212 is pivoted upwardly by leftward movement of the closing bar 179, since the tension of the spring 208 is greater than that afforded by the release lever spring 215. During leftward movement of the closing bar 179 a lateral arm 219 secured thereto, as shown in Fig. 2, engages the closing pin 177 secured to the shutter actuating disc 167. The closing bar arm 219 thus effects clockwise rotation of the actuating disc 167 to urge the shutter blades 152 and 153 to closed position.

As hereinbefore explained, depressing the shutter release button 201, permits an immediate leftward movement of the opening bar 178 in response to the spring 186. Instantaneously therewith, the disc 167 rotates to begin opening the shutter blades 152 and 153. After the opening bar 178 has moved approximately one quarter (¼) the distance in its return path of leftward movement, as shown in Fig. 3, the arm member 188 is moved out of engagement with the opening pin 176 and the shutter blades 152 and 153 are in open position as shown in Figs. 5 and 12. It will be apparent that the speed with which the opening bar 178 continues in a leftwardly direction, determines the instant the closing bar 179 moves leftwardly to complete closure of the shutter blades 152 and 153.

For selectively controlling the speed of leftward movement of the opening bar 178 to regulate the shutter speeds, a speed regulating cam 222 is rotatably journalled about a hub at the upper end of the tubular support 168, as shown in Figs. 2, 5 and 8. The outer periphery of the speed cam 222 is operative to effect selective positioning movement of a speed regulating lever 224 and to limit the extent of pivotal movement of a bulb lever 223. The bulb lever 223 is pivotally mounted on the shaft 197 secured to the shutter base plate 25, and is urged to pivot in a counter-clockwise direction by the spring 198. An upstanding abutment 225 secured to the shutter release lever is adapted to engage an arm of the bulb lever 223 to limit its pivotal movement. The bulb lever 223 is provided on another arm with an upwardly extending abutment 228 that is resiliently urged into engagement with the edge of the speed cam 222 to predeterminately position a latch 229 formed at the end of the opposite arm. With the speed cam 222 adjusted, as shown in Fig. 2, the bulb lever 223 is so positioned that the latch 229 on the opposite arm thereof is pivoted downwardly relative to the path of leftward movement of the opening arm lug 194. During this condition of speed cam adjustment, the bulb lever 223 and the latch formed thereon have no effect on leftward movement of the shutter opening bar 178.

To permit the bulb lever 223 to stop return leftward movement of the opening bar 178, the speed cam 222 is rotated to a position in which the lever abutment 228 engages a portion of reduced diameter, as indicated at 231 in Fig. 2. With the bulb lever abutment 228 engaging the cam periphery at 231, the latch 229 secured to the lever 223 is movable upwardly into the path of return leftward movement of the opening bar lug 194 whenever the shutter release button 201 is depressed. At the same time the speed regulating lever 224 is adjusted by the larger periphery of the speed regulating cam 222 to be positioned to permit instantaneous leftward movement of the opening bar 178.

During this condition of speed cam adjustment, depressing the shutter release lever 201 permits only initial leftward movement of the shutter opening bar 178, the upstanding lug of which is engaged by the upwardly pivoted latch 229 of the bulb lever. The latch 229 thus interrupts return movement of the shutter opening bar 178 to retain the shutters 152 and 153 in open position as long as the shutter release button 201 is held in depressed position. The shutter release button 201 thus operates, when depressed, to pivot both the release lever 196 and the bulb lever 223 in a clockwise direction. Releasing the button 201 in turn effects a simultaneous rotation of the lever 196 and the bulb lever 223 in a counter-clockwise direction, thus moving the latch 229 secured thereto downwardly to permit continued leftward movement of the opening bar 178.

For regulating the shutter speed independently of the bulb lever 223, the speed regulating lever 224 is journalled for pivotal adjustment about a shaft 233 secured to the shutter base plate 25. A spring 234 is connected to rotate the speed lever 224 in a counterclockwise direction to urge an upstanding arm 235 secured thereto into abutting engagement with the periphery of the speed cam 222; as shown in Figs. 2, 8 and 12, the speed lever 224 is provided with an arcuately formed gear segment 238 that meshingly engages complementary gear teeth formed on a rotatable pinion 239 journalled to rotate within the tubular support 168. The pinion 239 and a flywheel 240 are both fixedly secured to a shaft 241 journalled at its upper end to rotate in the upper hub formed with the tubular support 168. The lower end of the shaft 241 is journalled to rotate in a bored opening formed in a transverse support 244 secured at its ends to the spaced apart edges of the shutter base plate 25. The flywheel 240 is thus carried for rotation beneath the shutter guide plate 158. The pinion 239 secured to the flywheel 240 extends upwardly through a bored opening in the guide plate 158, through enlarged longitudinal slots in the shutter blades 152 and 153, and thence through a circular opening in the base plate 25 into a cylindrical opening in the tubular support 168.

The inertia of the flywheel 240 with the pinion 239 engaging the gear segment 238 operates to predeterminedly retard pivotal movement of the speed regulating lever 224. With the speed regulating cam 222 adjusted, as shown in Fig. 2, the arm 235 engages the cam periphery in such a manner that the speed lever is pivoted to the limits of its rightward movement. In this position the speed lever 224 is urged to pivot leftwardly in opposition to the spring 234 through its maximum arc of movement for effecting the slowest available shutter speed. To effect this result, the upper portion of the speed lever 224 is adapted to be engaged by an upwardly extending abutment lug 246 secured to the shutter opening bar 178. It will be noted that the lug 246 does not engage the regulating lever until the opening bar 178 has moved a sufficient distance in a leftward direction to fully open the shutter blades 152 and 153, as hereinbefore explained. Engagement of the lug 246 with the speed regulating lever 224 retards continued leftward movement of the opening bar 178 sufficiently to delay closure of the shutter blades 152 and 153 for a required timed interval.

To obtain progressively faster shutter speeds, the periphery of the speed cam 222 is so configured that counterclockwise adjustment of the cam positions the speed lever 224 for movement through smaller arcs of speed regulating movement. With the cam 222 rotated to predeterminedly position the regulating lever 224 in its extreme leftward position of adjustment, the lever is not operative to retard leftward movement of the bar 178. With the speed lever 224 in its extreme leftward position, therefore, the shutter opening bar 178 moves instantaneously at a uniform rate in a leftward direction to provide the fastest shutter speeds.

To selectively effect rotatable adjustment of the speed cam 222, a radial slot 247 formed therein is enaged by the lower end of an actuating pin 248 secured at its opposite end to the rotatable speed adjusting plate 73, as shown in Figs. 5 and 12. As hereinbefore explained, the adjusting plate 73 is secured to one end of the shaft 71 which also has affixed to its outer end the speed regulating knob 72. Adjacent its periphery, the regulating knob 72 is provided with indicia 249 representing the available range of shutter speeds that are adapted to be read against a zero mark 250 scribed on the upper face of the lens board 21. Thus, rotatable movement of the adjusting knob 72 for selecting a particular shutter speed effects a corresponding rotatable movement of the speed regulating cam 222.

One of the principal advantages of the invention is the simplicity and convenience of operatively assembling the various interconnecting parts comprising the complete lens supporting assembly 17. The initial step comprises assembling lens system having identical focal lengths in like arrangement within the respective lens tubes 19 and 20. As shown in Fig. 10, the diaphragm elements 102 and 103 are inserted in proper slidably superimposed relationship within the slot 98 in the lens tube 20. The cam 113 is then rotatably mounted on the lens tube 20, with the arcuate slots 112 and 118 engaging the respective depending actuating pins 111 and 116 secured to the diaphragm elements 103 and 102, as shown in Fig. 12. To retain the cam 113 in operative engagement encircling the lens tube 20, the U-shaped washer 83 is slidably engaged in the slots presented by the tube to complete the lens tube. In a similar manner, the other lens tube sub-assembly comprise the lens tube 19, the lens system carried thereby, and the U-shaped washer 82 engaging the slots formed in the opposite sides of the lens tube 19.

Next, the tubular support 51 with the lens focusing setting ring 56 journalled about its lower flanged end is placed over the required opening in the lens board 21 with the depending actuating pin 61 (secured to the ring 56) extending through the arcuate slot 93 formed therein, as shown in Figs. 4, 5 and 12. The tubular support 51 is then secured to the lens board 21 by means of the screws. In a similar manner, the lens tube 20 with the cooperating diaphragm setting ring 57 is secured to the lens board 21 with the depending actuating pin 121 secured to the ring 57 extending through the arcuate slot 123. The shaft 71 with the speed regulating knob 72 attached thereto is next inserted through the central opening in the lens board 21. The idler gear 70 is then placed in rotatable engagement about the shaft 71 and the speed regulating plate 73 fixedly secured to the lower end thereof by means of the snap ring 74.

The next and final step is operatively interconnecting the focussing gears 68 and 77, the diaphragm elements 102 and 103, and the lens tube sub-assemblies within the lens board 21 having the tublular supports secured thereto as hereinbefore described. This is accomplished by inverting the lens board 21 with the supports secured thereto, and placing the focussing gears 68 and 77 in operative overlying relationship to the tubular supports and in engagement with the idler gear 70. At the same time, the actuating pin 1217 is guided through the arcuate slot 122 in the gear 68, and the actuating pin 92 is engaged with the radial slot 89 in the gear 77.

To obtain the proper timing relationship between the focussing gears 68 and 70, suitable reference marks (not shown) scribed on the lower faces thereof are aligned with reference marks (not shown) scribed on the inner face of the lens board 21. After this, the respective lens tube assemblies with the diaphragm elements 102 and 103 slidably engaged therein, are simultaneously inserted through the bored openings in the gears 68 and 77 into the tubular supports 52 and 51. As this is being done, the actuating pin 121, secured to the diaphragm setting ring 57, is guided into engagement with the radial slot 120 formed in the cam 113. With the gears 68 and 77 positioned by means of the reference marks (not shown), the cams respectively formed therewith are positioned to abut the associated cams 61, 62 and 63 integrally formed with lens tubes 19 and 20. Since the diaphragm elements 102 and 103 restrain the lens tubes 19 and 20 against rotation, it will be apparent that the cams 61, 62 and 63 integrally formed therewith are automatically retained in predetermined nonrotatable position.

With the lens tube assemblies operatively engaged within the tubular supports 51 and 52, the forked ends of the springs 84 and 85 are respectively positioned to engage the underside of the respective U-shaped washers 82 and 83. The opposite flanged ends of the springs 84 and 85 are then secured to the inner side wall of the lens board 21 by means of the screws 87 and 88, as shown in Fig. 4, to complete the unitary lens and diaphragm assembly 17.

In a similar manner, the various cooperating parts, including the slidably superimposed shutter blades 152 and 153, are operatively assembled to the shutter base plate 25, as shown in Figs. 2, 5 and 12, to constitute the improved unitary shutter assembly 16 together with actuating and speed regulating mechanism therefor. Likewise, as fully explained hereinbefore, the frame 15 is completed by operatively assembling the aperture plates 33 and 34 therein in a manner that the rearward faces thereof provide image planes properly related to the lens tubes 19 and 20. After the three principal cooperating units have been completely assembled, the camera is completed by respectively securing the shutter base plate 25 and the lens board 21 to the frame 15.

From the foregoing description and explanation of the stereo camera herein set forth as exemplifying the invention, it is apparent that there has been provided an improved stereo camera of novel unit type construction comprising essentially a frame, a shutter assembly, and a cooperating lens and diaphragm assembly. The coaction between the various parts comprising each of the principal units, as well as the coaction between the units, is adapted to greatly simplify the manufacture and assembly of an improved stereo camera. In addition, there is provided an improved simplified shutter comprising a pair of slidably superimposed shutter blades together with improved actuating and speed regulating mechanism for the shutter blades. A similar arrangement is provided for the diaphragm, that likewise comprises a pair of slidably superimposed elements guided for longitudinal movement within a pair of spaced apart lens tubes. The lens tubes in turn are restrained against rotatable movement by the diaphragm elements, and are actuated for axial focussing movement by a pair of cams journalled about the lens tubes. In order to predeterminately adjust the focal lengths of the lens tubes relative to the image plane, a pair of aperture plates are removably secured within the frame in a manner that the rearward faces thereof constitute separate image planes for the spaced apart frames of a film strip.

The illustrative embodiments have been set forth in detail for the purpose of setting forth practical exemplifying apparatus. It is to be understood, however, that the particular structures herein described are intended to be illustrative only. The various inventive features adapted to accomplish the improved results therefore may be incorporated in other structural forms without departing from the spirit and scope of the invention as defined in the subjoined claims.

The principles of this invention having now been fully explained in connection with the foregoing description, I hereby claim as my invention:

1. In a camera, a frame having a pair of spaced apart openings extending therethrough, a lens board secured to said frame having a pair of spaced apart openings aligned with the openings in said frame, a pair of lens carrying tubes movably guided by the openings in said frame for axial focussing movement, a pair of focussing gears rotatably journalled about said tubes adjacent the inner face of said lens board, said gears being provided with inwardly extending cam surfaces, said lens tubes being provided with laterally extending cams disposed to engage the cams provided on said gears, resilient means connected to urge said lens tubes forwardly in a manner that the lateral cams on said tubes are retained in abutting engagement with the cams on said gears, said tubes being provided with transverse slots, a pair of diaphragm blades movably carried by the slots in said tubes for slidably superimposed longitudinal movement, said diaphragm blades being respectively provided with a pair of spaced apart openings, means connected to simultaneously move said diaphragm blades in opposite directions to move said openings out of alignment for reducing the size of the apertures through said lens tubes, a focussing control connected to simultaneously rotate said focussing gears for effecting a selective axial focussing movement of said lens tubes, and a pair of aperture plates having central openings respectively secured to the rearward face of said frame in a position to encompass the openings contained therein, said aperture plates being predeterminately adjustable relative to said lens tubes in a manner that the rearward faces thereof respectively provide image planes for the spaced apart frames of a film strip.

2. In a stereo camera, a frame, a pair of spaced apart lens carrying tubes movably associated with said frame for axial focussing movement, each of said lens tubes being provided with a transverse slot, a pair of superimposed diaphragm blades movably carried by the slots in said tubes for adjustable movement, said blades being disposed to restrain said lens tubes against rotation during axial focussing movement thereof, said blades being respectively provided with a pair of spaced apart openings, said diaphragm blades being so positionable that when the openings formed therein are in registration, an aperture of maximum light admitting size is provided within each of said lens tubes, and a cam actuated mechanism disposed on one of said tubes connected to position said blades longitudinally to vary the aperture from the maximum light admitting size to a closed position whereby the admission of light to each of said tubes may be uniformly and selectively controlled while said lens tubes are actuated for axial focussing movement.

3. In a shutter for a stereo camera provided with a pair of spaced apart lens carrying tubes, a base plate provided with a pair of spaced apart openings respectively aligned with said lens tubes, a pair of superimposed shutter blades slidably carried by said base plate for selective longitudinal movement in opposite directions, said shutter blades being respectively provided with spaced apart openings that are movable therewith into registration with the openings in said base plate, an actuating disc journalled to rotate about an axis perpendicular to the plane in which said shutter blades are movable, a pair of actuating pins secured to one face of said disc in parallel spaced relationship at opposite sides of the axis thereof, one of said pins being connected to engage one of said shutter blades and the other of said pins being connected to engage the other of said shutter blades, an opening bar slidably secured to said base plate connected to rotate said disc in one direction for moving said shutter blades in opposite directions in a manner that the openings contained therein are moved into registration with the openings contained in said base plate, and a closing bar slidably carried by said base plate connected to rotate said disc in the opposite direction for in turn moving said shutter blades in opposite directions in a manner that the openings contained therein are moved out of registration to preclude the passage of light through said lens tubes as well as the openings in said base plate.

4. In a camera, a lens tube, a selectively openable shutter mechanism operatively associated with said lens tube and being normally retained in closed position to preclude passage of light through said lens tube, a longitudinally slidable opening bar connected to actuate said shutter mechanism from closed to open position for permitting the passage of light through said lens tube, a longitudinally slidable closing bar connected to actuate said shutter mechanism from open position to its normally closed position, a tripping mechanism connected to effect a sequential actuation of said opening bar and said closing bar for effecting a sequential opening and closing of said shutter mechanism, a resiliently biased arm pivotally carried for movement through a limited arc of movement connected to selectively delay the actuation of said closing bar, a flywheel connected to be rotated by pivotal movement of said arm, and a rotatable cam operatively connected to selectively limit the extent of pivotal movement of said arm.

5. In a shutter actuating mechanism for a stereo camera, a base plate having a pair of spaced apart openings, a pair of slidably superimposed shutter blades slidably carried by said base plate for movement in opposite directions, said shutter blades being respectively provided with a pair of openings spaced apart a distance equal to the distance between the openings in said base plate, a rotatable actuating disc journalled on said base plate, said disc being connected when rotated in one direction to effect movement of said shutter blades in opposite directions for moving the openings contained therein into registration with the openings in said base plate, said disc being connected when rotated in the opposite direction to move said shutter blades to closed position in a manner that the openings contained therein are moved out of registration to preclude the passage of light beyond said base plate, a movable opening bar carried by said base plate connected to rotate said disc for moving said shutter blades to an open position, a closing bar movably carried by said base plate connected to rotate said disc for moving said shutter blades to a closed position, a selectively actuatable tripping mechanism connected to effect a sequential actuation of said opening bar and said closing bar, and a flywheel journalled on said base plate connected to selectively delay the sequential actuation of said closing bar for a predetermined timed interval after said opening bar has been actuated by said tripping mechanism.

6. In a stereo camera, a lens board provided with a pair of spaced apart circular openings disposed in parallelism, a pair of circular lens carrying tubes slidably guided by the circular openings in said lens board for axial focussing movement, each of said lens tubes being provided with a laterally extending cam operative to limit forward movement of said lens tubes, resilient means connected to effect axially forward movement of said lens tubes, each of said lens tubes being provided with a transverse slot, a pair of slidably superimposed diaphragm blades transversely carried in said axially adjustable lens tubes, said diaphragm blades being respectively provided with spaced apart openings and being simultaneously movable in opposite directions to selectively vary the passage of light through said lens tubes, a pair of rotatable focussing members journalled to rotate about said lens tubes intermediately the rearward face of said lens board and the said cams carried by said lens tubes, and means connected to effect simultaneous rotation of said focussing members relative to said cams for effecting simultaneous movement of said lens tubes in opposition to said resilient means.

References Cited in the file of this patent

UNITED STATES PATENTS

| | | |
|---|---|---|
| 317,788 | Hoover | May 12, 1885 |
| 369,997 | Simon | Sept. 13, 1887 |
| 738,066 | Reichenbach | Sept. 1, 1903 |
| 1,957,043 | Harlow | May 1, 1934 |
| 2,246,439 | Hennicke | June 17, 1941 |
| 2,328,677 | Ringer | Sept. 7, 1943 |
| 2,361,661 | Sparling | Oct. 31, 1944 |
| 2,385,804 | Fitz | Oct. 2, 1945 |
| 2,453,075 | Land | Nov. 2, 1948 |
| 2,476,576 | Bachelder | July 19, 1949 |
| 2,541,555 | Sorkin | Feb. 13, 1951 |
| 2,729,153 | Heidecke | Jan. 3, 1956 |